United States Patent [19]

Moon, Jr.

[11] Patent Number: 5,220,225
[45] Date of Patent: Jun. 15, 1993

[54] INTEGRATED ELECTRIC MOTOR DRIVEN INLINE HYDRAULIC APPARATUS

[75] Inventor: Harry C. Moon, Jr., Royal Oak, Mich.

[73] Assignee: Vickers, Incorporated, Troy, Mich.

[21] Appl. No.: 900,943

[22] Filed: Jun. 17, 1992

[51] Int. Cl.⁵ .......................... H02K 5/10; F04B 1/00
[52] U.S. Cl. ..................................... 310/87; 417/271
[58] Field of Search ................. 310/67 R, 87, 89, 90, 310/52, 58, 60 R, 63; 417/270, 271, 272, 350

[56] References Cited

U.S. PATENT DOCUMENTS

| | | | |
|---|---|---|---|
| 1,019,521 | 3/1912 | Pratt | 417/271 |
| 3,672,793 | 6/1972 | Yowell | 417/271 |
| 4,575,315 | 3/1986 | Galais et al. | 310/87 |
| 4,729,717 | 3/1988 | Gupta | 417/271 |
| 4,850,812 | 7/1989 | Voight | 417/271 |
| 5,073,091 | 12/1991 | Burgess et al. | 417/271 |

Primary Examiner—Steven L. Stephan
Assistant Examiner—Matthew Nguyen
Attorney, Agent, or Firm—Barnes, Kisselle, Raisch, Choate, Whittemore & Hulbert

[57] ABSTRACT

An integrated electric motor driven inline hydraulic apparatus comprising a housing, an electric motor having a stator fixed to the housing and a rotor surrounded by the stator. A positive displacement hydraulic pump comprises a cylinder block supported on bearings in the housing and includes a plurality of circumferentially spaced through bores in the cylinder block. A pair of opposing pistons reciprocate in each cylinder bore, the pistons extending from the cylinder block to cooperate with inclined surfaces which induce reciprocation of the pistons with cylinder block rotation. A valve is adapted to alternately connect the chambers between the opposing sets of pistons with a fluid inlet and a fluid outlet during cylinder block rotation. The housing has a hydraulic fluid inlet adjacent one end thereof such that hydraulic fluid from the inlet flows over the stator, air gap between the stator and rotor and over the rotor. The pump has an inlet such that hydraulic fluid therefor flows to the inlet of the pump and an outlet of hydraulic fluid from the pump to the hydraulic system supplied by the pump.

4 Claims, 4 Drawing Sheets

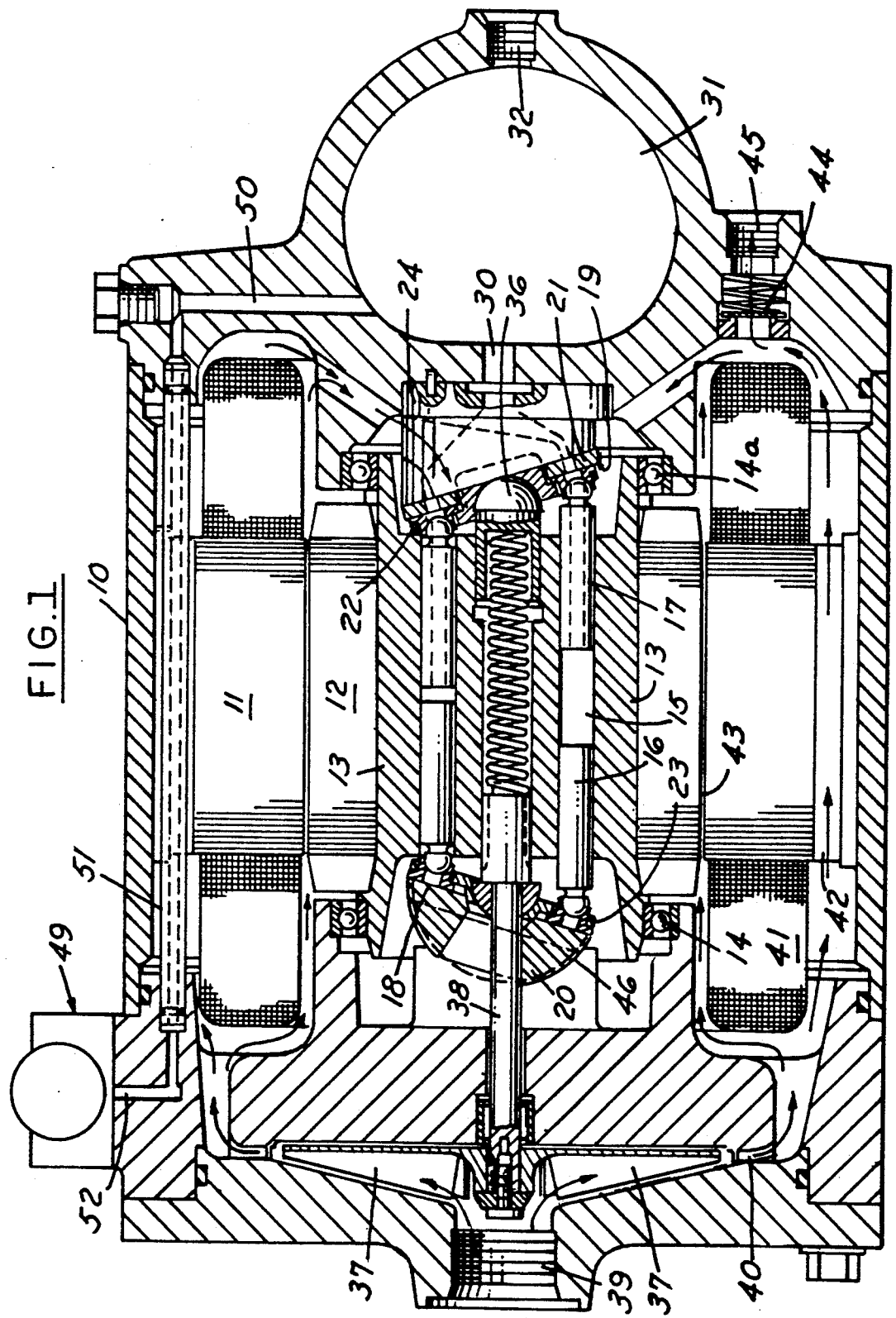

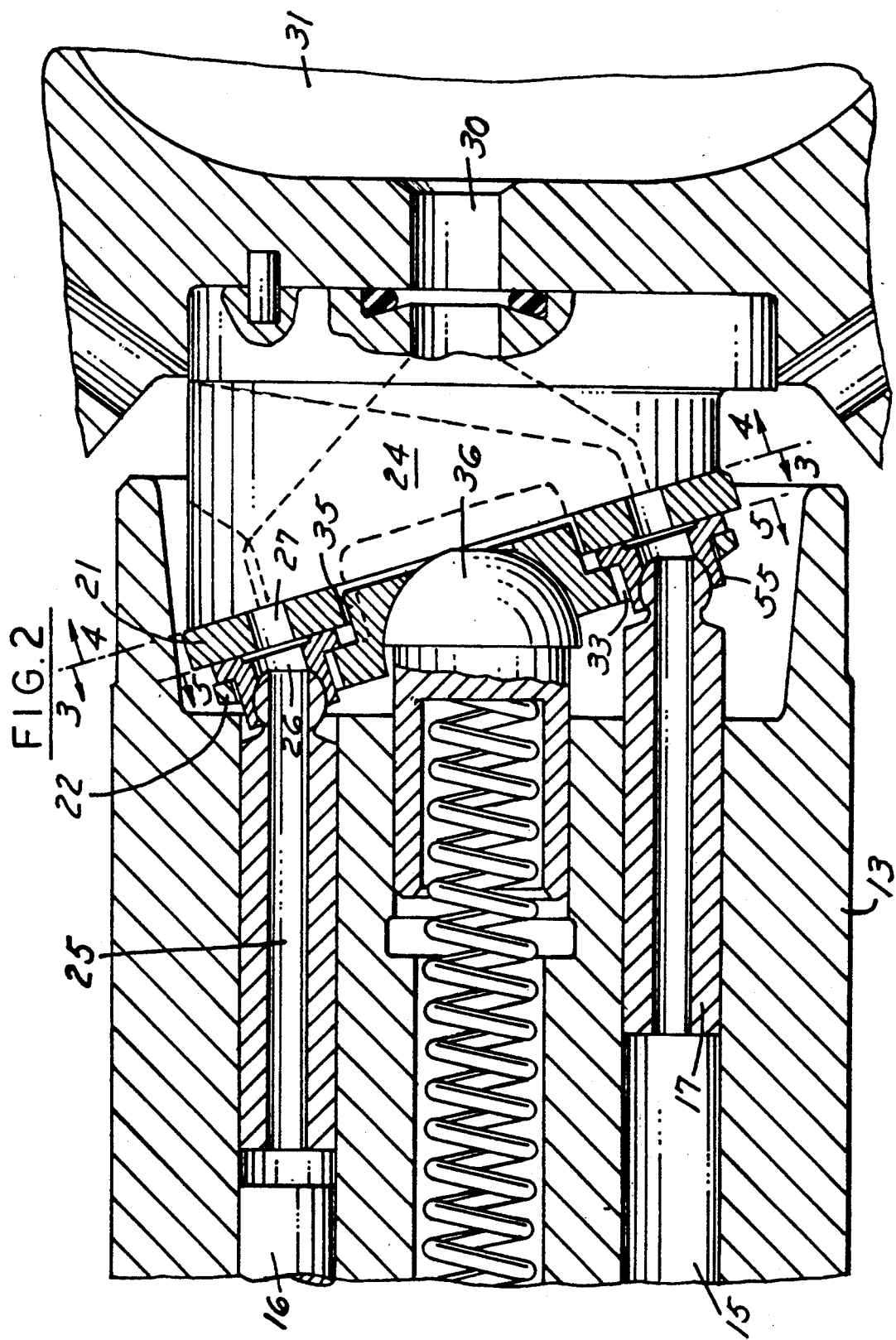

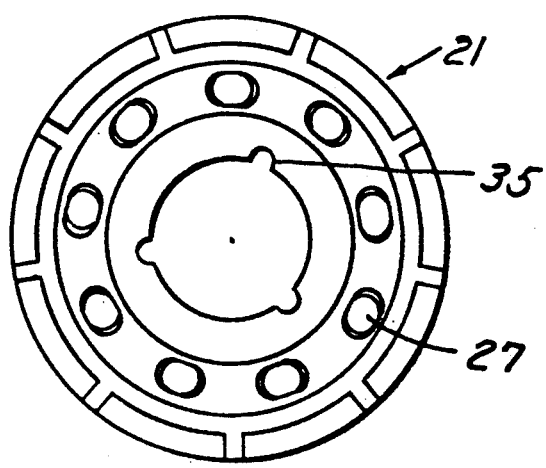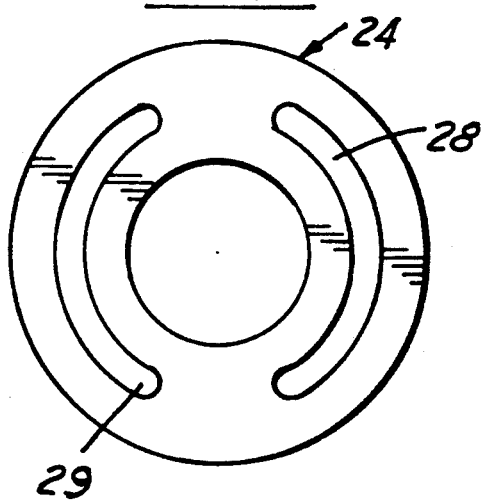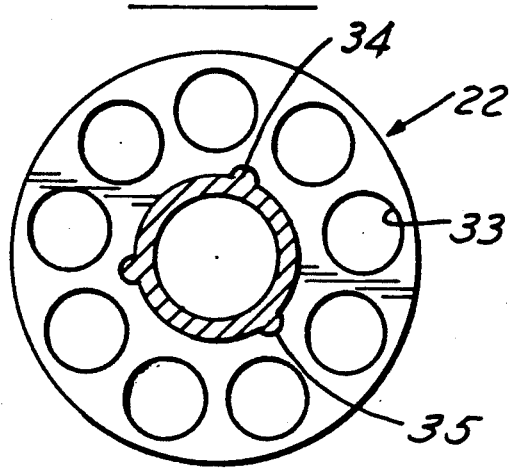

INTEGRATED ELECTRIC MOTOR DRIVEN INLINE HYDRAULIC APPARATUS

This invention relates to positive displacement hydraulic pumps driven by electric pumps.

BACKGROUND AND SUMMARY OF THE INVENTION

In machine tool and other industrial applications, where positive displacement hydraulic pumps are driven by electric motors, it is common practice to provide an air cooled electric motor in one housing and the hydraulic pump in another housing. Each of these units has its own drive shaft. Normally these shafts are connected by a suitable flexible coupling arrangement and the housings are connected by a mounting adaptor.

In addition, it has been known in the art to provide an integrated electric pump and motor such as shown in U.S. Pat. No. 4,729,717 and co-pending applications Ser. Nos. 07/687,173 filed Apr. 18, 1991 and 07/787,670 filed Nov. 4, 1991.

Among the objectives of this invention are to: 1. provide an integrated electric motor and hydraulic pump wherein the electric motor and the variable displacement hydraulic piston pump are encapsulated in a common housing without drive shafts thus reducing unit size and eliminating parts; wherein the potential for external fluid leakage is reduced by eliminating the need for rotating shaft seals; wherein improved cooling of the electric motor is obtained by using oil cooling thus allowing the use of smaller electric components; wherein noise level of unit is reduced by providing a smaller stiffer structure and reducing the magnitude of the axial hydraulic force that is transmitted to the structure; and wherein fluid pressure pulsations are reduced by increasing the volume of fluid in the discharge port.

In accordance with the invention, the integrated electric motor and hydraulic pump comprises a housing, and an electric motor and a variable displacement piston type hydraulic pump within said housing, the rotor of the electric motor is coaxially mounted on the cylinder block of the hydraulic pump. The stator of the electric motor surrounds the rotor and is mounted in the housing. The housing has an inlet for hydraulic fluid and the fluid flows axially of the pump from one end of the housing over the stator and rotor to the inlet of the hydraulic pump and then outwardly from the outlet of the pump to the actuators or other components of the hydraulic system.

DESCRIPTION OF THE DRAWINGS

FIG. 1 is a longitudinal sectional view of an electric motor driven in line hydraulic apparatus embodying the invention.

FIG. 2 is a fragmentary view on an enlarged scale of a portion of the apparatus.

FIG. 3 is a sectional view taken along the line 3—3 in FIG. 2.

FIG. 4 is a sectional view taken along the line 4—4 in FIG. 2.

FIG. 5 is a sectional view taken along the line 5—5 in FIG. 2.

DESCRIPTION

Figure 6:
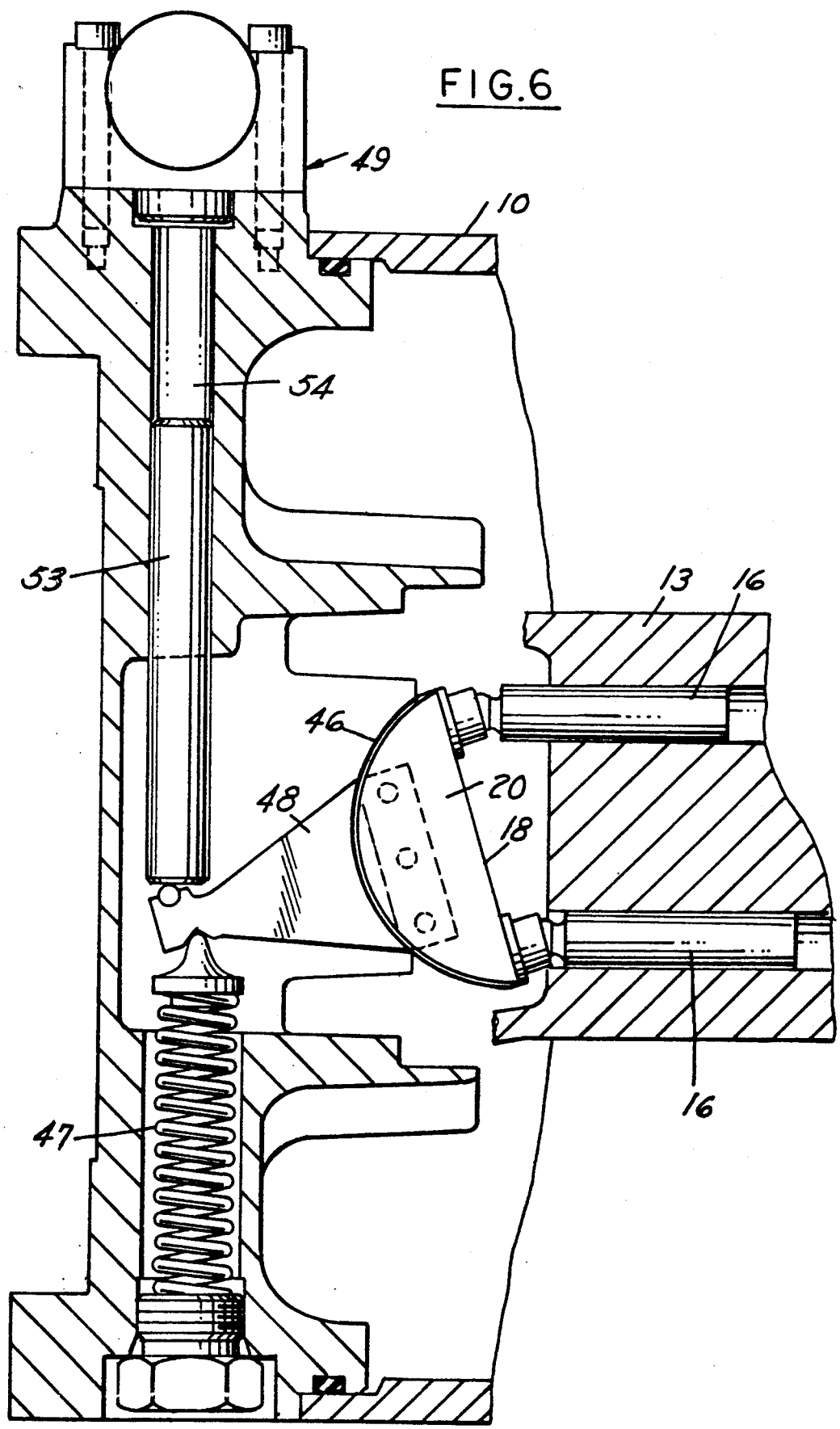
FIG. 6 is a fragmentary sectional view showing a mechanism for modulating the yoke angle of the pump.

FIG. 1 illustrates the preferred embodiments of this invention. Basically the invention comprises a housing 10 common to the electric motor and the pump. The electric motor stator 11 is mounted in housing 10. The electric motor rotor 12 is coaxially mounted on cylinder block 13 of the pump which is supported on bearings 14 and 14a in said housing 10. The cylinder block 13 includes a plurality of circumferentially spaced axial through bores 15. Pairs of opposing piston and shoe subassemblies 16 and 17 reciprocate in each cylinder bore 15. Piston and shoe subassemblies 16 and 17 extend from cylinder block 13 to cooperate with oppositely inclined surfaces 18 and 19, of a yoke 20 and a valve plate 21, which induces piston axial reciprocation as the cylinder block 13 is rotated by the electric motor.

The piston and shoe subassemblies 16 and 17 are held against the inclined bearing surface 18 and 19 by compression forces during the discharge stroke and by spring biased shoe hold-down plates 23 and 22 during the intake stroke. The inclined bearing surfaces are defined by the variable yoke 20 and fixed cam plate 24.

Referring to FIG. 2 piston/shoe subassemblies 17 transmit rotary driving torque to shoe hold-down plate 22 at the point where the outer shoe surface 55 contacts hole 33 (FIG. 5) in shoe plate 22. The shoe plate 22 includes teeth 34 (FIG. 5) which drivingly engage grooves 35 (FIG. 3) in valve plate 21. Thus the valve plate 21 rotates in synchronization with the piston. A spherical guide 36 radially locates shoe hold-down plate 23 which, in turn, pilots valve plate 21.

Referring to FIG. 2, during the intake stroke each piston and shoe subassembly 16, 17 is withdrawn from the cylinder block 13 by the shoe plate. Fluid is drawn into its cylinder bore 15 through passages 25 and 26 in the piston shoe subassembly 17 and through passages 27 (FIG. 3) in valve plate 21 which is in communication with inlet kidney slot 28 (FIG. 4) in cam plate 24. Further rotation of the cylinder block 13 brings it to the discharge stroke during which the piston shoe subassembly is forced in to the cylinder bore expelling the fluid from the bore through conduits 25, 26 and 27 into the outlet kidney 29 (FIG. 4) of cam plate 24. The discharge fluid from outlet kidney 29 flows through conduit 30 and fluid volume chamber 31 to outlet port 32 (FIG. 1).

Referring to FIG. 1, the motor/pump unit includes a centrifugal impeller 37 which imparts kinetic energy to the fluid to provide flow circulation for cooling the electric motor components and boost pressure for pump filling. The impeller 37 is driven by shaft 38 which is attached by a spline connection to the rotating cylinder block 13.

As shown by the arrows in FIG. 1, fluid is drawn through the inlet port 39 passing through impeller 37 and diffuser passage 40. This flow passes over the stator windings 41 through axial slots 42 at the stator outside diameter and through the air gap 43 between the rotor 12 and stator 11 thereby cooling the electric motor components. Such an intimate fluid contact with the stator windings and rotor bars permit a superior heat dissipation of the electric motor so that a smaller motor can be used. The flow is then directed to the inlet kidney slot 28 (FIG. 4). Flow in excess of that required by the pump passes over case relief valve 44 through case drain port 45 back to the hydraulic reservoir.

Referring to FIG. 1, the cam plate 24 has a fixed angle with respect to the axis of rotation therefore the displacement of piston 17 will be constant with cylinder block rotation. Yoke 20 is pivotally mounted in a saddle type journal bearing 46 (FIG. 6) so that the angle of its surface 18, relative to the axis of rotation, can be varied. When the yoke is in the position shown in FIG. 1, both sets of pistons are pumping at maximum displacement thus producing maximum flow. When yoke 20 is rotated counter clockwise so, that its surface 18 is at a right angle to the axis of rotation (not shown), pistons 16 do not reciprocate. Therefore total displacement of both sets of pistons will be at 50% of the maximum units displacement. Further counter clockwise rotation of yoke 20, to the position shown in FIG. 6, puts bearing surface 18 at the same angle to the axis of rotation as bearing surface 19 (FIG. 1). In this position pistons 16 are in a motoring mode of operation and are absorbing the total output flow generated by pistons 17. Therefore total output flow from the two sets of pistons is zero.

FIG. 6, shows the mechanism for modulating the yoke angle and thus the total output flow from both sets of pistons 16 and 17. Spring 47 acting through leaver 48 (which is attached to yoke 20) biases yoke 20 in a clockwise direction toward a maximum pump flow position. Fluid pressure in pump outlet chamber 31 (FIG. 1) is communicated to the pressure compensated valve assembly 49 through conduits 50, 51 and 52 (FIG. 1). The pressure compensator valve assembly, which operates in a manner well known in prior art, controls the displacement of the pump to maintain a substantially constant pressure in the high pressure outlet chamber 31 (FIG. 1). The control valve assembly effects this control by porting fluid to a control piston 53, which acts on yoke leaver 48 against the biasing force of spring 47. The influx of fluid under pressure in piston chamber 54 will bias the yoke in a counter clockwise direction a a position where there is no positive output flow from the pump.

I claim:

1. An integrated electric motor driven inline hydraulic apparatus comprising
   a housing,
   an electric motor having a stator fixed to said housing and a rotor surrounded by said stator,
   a positive displacement hydraulic pump comprising a cylinder block supported on bearings in said housing,
   a plurality of circumferentially spaced through bores in said cylinder block,
   a pair of opposing pistons reciprocable in each cylinder bore,
   each said pair of pistons defining a chamber therebetween,
   a yoke having an inclined surface engaged by one of each said pairs, of pistons and a valve plate having an inclined surface engaged by the other of each said pair of pistons,
   said pistons extending from said cylinder block to cooperate with said inclined surfaces to induce reciprocation of said pistons with cylinder block rotation, and
   valve means adapted to alternately connect the chambers between said opposing sets of pistons with a fluid inlet and a fluid outlet during cylinder block rotation,
   said rotor being coaxially mounted on said cylinder block such that as the rotor is rotated the cylinder block is rotated inducing axial reciprocation of the pistons,
   said housing having a hydraulic fluid inlet adjacent one end thereof such that hydraulic fluid from said inlet flows over the stator, air gap between the stator and rotor and over the rotor,
   said pump having an inlet such that hydraulic fluid therefor flows to the inlet of said pump,
   said pump having an outlet of hydraulic fluid from the pump to the hydraulic system supplied by said pump.

2. The apparatus set forth in claim 1 wherein each said inclined surface defines an angle, said angle of one of the said inclined surfaces being variable by a control means to change pump displacement.

3. The apparatus set forth in claim 1 including means for supplying fluid to said drive said pump as a motor and drive said electric motor as a generator.

4. The apparatus set forth in claim 1 including an impeller within said housing driven by said rotor for facilitating the flow of hydraulic fluid through said housing.

* * * * *